United States Patent
Drewes et al.

(10) Patent No.: US 8,249,580 B2
(45) Date of Patent: Aug. 21, 2012

(54) METHOD OF MEASUREMENT REPORTING, METHOD OF HANDLING MEASUREMENT REPORTS, CELLULAR RADIO TERMINAL AND CELLULAR RADIO NETWORK UNIT

(75) Inventors: Christian Drewes, Germering (DE); Hyung-Nam Choi, Hamburg (DE); Dirk Nickisch, Neubiberg (DE)

(73) Assignee: Intel Mobile Communication GmbH, Neubiberg (DE)

( * ) Notice: Subject to any disclaimer, the term of this patent is extended or adjusted under 35 U.S.C. 154(b) by 544 days.

(21) Appl. No.: 12/427,768

(22) Filed: Apr. 22, 2009

(65) Prior Publication Data
US 2010/0273472 A1    Oct. 28, 2010

(51) Int. Cl.
    *H04W 24/00*    (2009.01)
(52) U.S. Cl. .............. 455/423; 455/437; 455/67.11; 370/332; 370/333; 370/345
(58) Field of Classification Search ............. 455/423, 455/437, 67.11; 370/332, 333, 345
    See application file for complete search history.

(56) References Cited

OTHER PUBLICATIONS

3GPP TS 25.331 V8.4.0 (Sep. 2008) 3rd Generation Partnership Project; RRC Protocol Specification 14.1.2 Intra-frequency reporting events for FDD pp. 1-2.
3GPP TS 25.331 V8.4.0 (Sep. 2008) 3rd Generation Partnership Project; RRC Protocol Specification 14.2.1 Inter-frequency reporting events pp. 1-2.
3GPP TS 25.331 V8.4.0 (Sep. 2008) 3rd Generation Partnership Project; RRC Protocol Specification 14.3.1 Inter-RAT reporting events pp. 1-2.
3GPP TS 34.108 V8.4.0 (Sep. 2008) 3rd Generation Partnership Project; Technical Specification Gruop Radio Access Network; Common test environments for User Equipment—Conformance testing (Release 8) 6.8.2.2 Inter Frequency FDD measurement & Inter RAT measurement GSM; pp. 1-3.

*Primary Examiner* — Amancio Gonzalez

(57) ABSTRACT

A method of measurement reporting, a method of handling measurement reports, a cellular radio terminal and a cellular radio network unit are provided. A method of measurement reporting comprises sending a first measurement report and sending a second measurement report after the sending a first measurement report, the second measurement report comprising an indication that the first measurement report is not valid anymore. A method of handling measurement reports comprises receiving such first and second measurement reports, discarding the first measurement report and processing the second measurement report. A cellular radio terminal is configured to carry out the method of measurement reporting. A cellular radio network unit is configured to carry out the method of handling measurement reports.

20 Claims, 3 Drawing Sheets

METHOD OF MEASUREMENT REPORTING, METHOD OF HANDLING MEASUREMENT REPORTS, CELLULAR RADIO TERMINAL AND CELLULAR RADIO NETWORK UNIT

TECHNICAL FIELD

Embodiments of the invention relate generally to a method of measurement reporting, to a method of handling measurement reports, to a cellular radio terminal and to a cellular radio network unit.

DETAILED DESCRIPTION OF THE INVENTION

The following detailed description explains exemplary embodiments of the present invention. Where applicable the description of a method embodiment is deemed to describe also the functioning of a corresponding apparatus embodiment and vice versa. The description is not to be taken in a limiting sense, but is made only for the purpose of illustrating the general principles of the invention. The scope of the invention, however, is only defined by the claims and is not intended to be limited by the exemplary embodiments described below.

Figure 1:
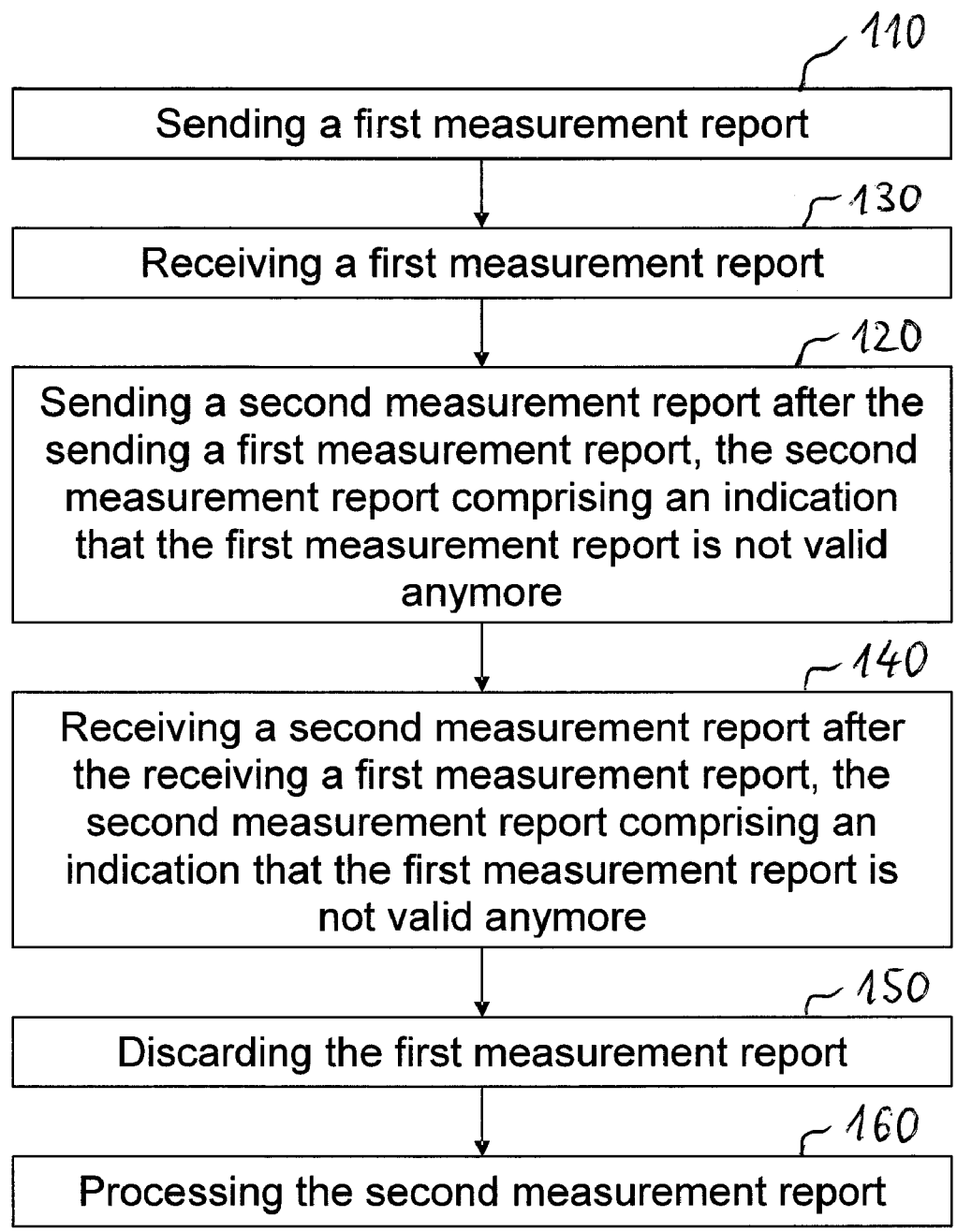
FIG. 1 shows a method of measurement reporting in accordance with an embodiment of the invention and shows a method of handling measurement reports in accordance with another embodiment of the invention in a combined flow diagram of both methods.

In FIG. 1 a method of measurement reporting in accordance with an embodiment of the invention and a method of handling measurement reports in accordance with another embodiment of the invention are shown in a combined flow diagram of both methods.

First the method of measurement reporting in accordance with an embodiment of the invention is described.

At 110, a first measurement report is sent.

At 120, a second measurement report is sent after the first measurement report has been sent. The second measurement report comprises an indication that the first measurement report is not valid anymore.

Next the method of handling measurement reports in accordance with another embodiment of the invention is described.

At 130, a first measurement report is received.

At 140, a second measurement report is received after the first measurement report has been received. The second measurement report comprises an indication that the first measurement report is not valid anymore.

At 150, the received first measurement report is discarded.

At 160, the received second measurement report is processed.

The method of measurement reporting and the method of handling measurement reports may be combined in accordance with yet another embodiment of the invention.

In this case the first measurement report received at 130 is the first measurement report sent at 110 and the second measurement report received at 140 is the second measurement report sent at 120.

In accordance with an embodiment of the invention a piece of information is sent together with a measurement report in a cellular radio system to indicate that a previous measurement report is not valid anymore.

This has the effect to prevent that an outdated measurement result is used to change the configuration of an active set of radio cells assigned to a cellular radio terminal.

For any cellular radio system it is essential that the terminal (in a UMTS system referred to as user equipment, UE) is connected to a proper specific radio cell served by a base station (in a UMTS system referred to as NodeB), which is usually located in the vicinity of the terminal. In UMTS a single NodeB can serve multiple sectors or cells. Signals sent out from the NodeB in this cell need to be received with a quality that allows data reception with a sufficient quality. Due to mobility of the UE this serving cell can change via handover procedures which are under the control of UTRAN. The UE supports such a handover procedure with measurement reports (MR) indicating that new cells pop up or other cells disappeared. The measurements to be performed and reported by UE are setup by UTRAN.

In a UMTS system based on W-CDMA and FDD mode as specified by 3GPP, a UE-specific so-called Active Set (AS) is defined. The AS is a list which consists of up to six cells. All cells of the AS operate in the same frequency band and the UE has simultaneous connections to all cells of its AS. All cells of the AS send the same data in DL to allow a smooth Soft Handover (SHO) between different cells. A proper MR can trigger an AS update (ASU) by the network (UTRAN), i.e. UTRAN controls which cell to add, replace or delete in the AS. The main principle is the AS should contain only the strongest cells, i.e. the cells with the best signal quality. The concept of AS and Soft Handover resp. provides a mean to significantly improve the link quality between UE and NodeB.

For mobility management reasons, the UE has to constantly measure the AS cells, as well as neighboring cells not belonging to the AS. The measurements include the received signal code power (RSCP) of the primary common pilot channel (P-CPICH) and the P-CPICH chip signal-to-noise ratio (Ec/No). In a UMTS system based on W-CDMA a cell can be identified by its primary CPICH. The UE is configured by UTRAN which measurements to perform (e.g. intra-frequency measurements, inter-frequency measurements, inter-RAT measurements) and the associated measurement reporting events with which the corresponding MR are triggered if the criteria for the events are fulfilled.

A couple of measurement events are defined, e.g.:

Intra-frequency reporting event 1a: a primary CPICH enters the reporting range;

Intra-frequency reporting event 1b: a primary CPICH leaves the reporting range;

Intra-frequency reporting event 1c: a non-active P-CPICH becomes better than an active P-CPICH;

Inter-frequency reporting event 2d: the estimated quality of the currently used frequency is below a certain threshold;

Inter-frequency reporting event 2f: the estimated quality of the currently used frequency is above a certain threshold.

The complete list of measurement events can be found in 3GPP TS 25.331 [1].

For instance, the UE shall trigger events 1a/b/c and 2d/f when certain conditions are fulfilled for a certain time period (time to trigger, TTT) indicated by the UTRAN.

With $$Q = W \cdot 10 lg \sum_{i=1}^{N_A} M_i + (1-W) \cdot 10 lg M_{Best}$$

the conditions are
for event 1a: 101 g $M_{New} \geq Q - R_{1a}$;
for event 1b: 101 g $M_{Old} \leq Q - R_{1b}$;
for event 1c: 101 g $M_{New} \geq$ 101 g $M_{Worst}$;
for event 2d: $Q \leq T_{2d}$;
for event 2f: $Q \geq T_{2f}$.

The measurement results M can be based on Ec/No or RSCP. Q is the quality estimate of the currently used frequency. $M_{New/Old}$ is the measurement result of the cell entering/leaving the reporting range, $M_i$ is a measurement result of an AS cell, $N_A$ is the number of AS cells, $M_{Best/Worst}$ is the measurement result of the AS cell with the highest/lowest measurement result, W is a weighting parameter between 0 and 1, $R_{1a}$ and $R_{1b}$ are the reporting range constants for the events 1a and 1b resp., $T_{2d/f}$ are absolute thresholds applying for the used frequency and events 2d/f.

In order to limit the amount of event-triggered measurement reports additionally, cell specific offsets can be added, hysteresis parameters can be defined for all events, and not all AS cells might be allowed to affect the reporting range. Note that therefore Q can be different for different events. Instead of Ec/No or RSCP also the path loss can be used for triggering measurement events. In that case slightly modified conditions are applied. Again, the complete specification can be found in 3GPP TS 25.331 [1].

Events 1a/b/c are used to control the AS. With 1a new cell is indicated that can be added to the AS, 1b indicates that a cell should be removed from the AS, and 1c replaces a cell of the AS. All ASUs are controlled by UTRAN. But, there is no guarantee that UTRAN follows the ASU implied by a MR.

Events 2d/f are used to control compressed mode (CM). With 2d a UE indicated that the currently used frequency is quite bad and CM should be entered. If radio conditions in the currently used frequency recovered again, 2f is sent to deactivate CM. CM is used to measure cells on different WCDMA frequency bands or different radio systems like GSM. Artificial periodic transmission and reception gaps are introduced, which allow the UE to have a quick look onto the cells on other frequencies/systems to check whether a suitable candidate cell for a handover is present.

Figure 2:
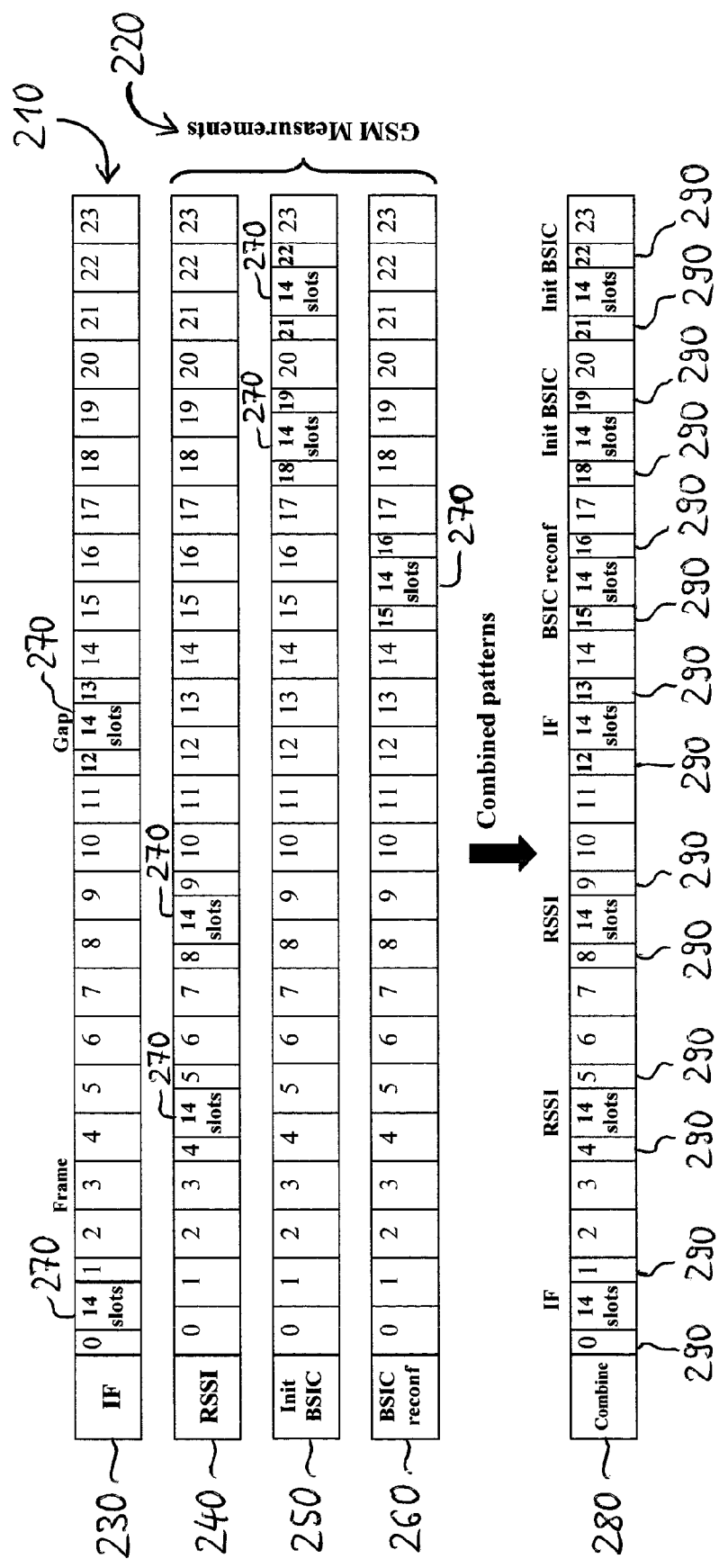
FIG. 2 shows several radio frame patterns for compressed mode with measurement gaps in accordance with embodiments of the invention.

FIG. 2 shows several radio frame patterns for compressed mode with measurement gaps in accordance with embodiments of the invention.

Here an example for the configuration of multiple compressed mode patterns consisting of one inter-frequency FDD measurement 210 and three inter-RAT GSM measurements 220 is given.

Shown are separate transmission patterns for "IF" 230, "RSSI" 240, "Init BSIC" 250 and "BSIC reconf" 260. The transmission gaps 270 each have a length of 14 slots. The combined compressed mode pattern "Combine" 280 includes 14 compressed frames 290 during a 24 radio frames cycle.

In detail, the "compressed mode" procedure has been introduced in the UMTS system operating in W-CDMA and FDD mode to allow UEs, which have only one receiver part (e.g. for cost reasons), inter-frequency-measurements (i.e. on UMTS mobile radio cells, which are operated on another frequency band compared with the frequency band used for the current mobile radio cell in which the UEs are located) and inter-RAT measurements (i.e. on mobile radio cells of another mobile radio communications system, e.g. GSM). As mentioned, a defined number of inter-frequency measurements and/or inter-RAT measurements may be configured for a UE. Each of these measurements is configured for a UE by UTRAN using individual compressed-mode parameters, i.e. the configured transmission gaps usually do not overlap each other in the time domain. By way of example, in the case of the DL transmission direction, the NodeB interrupts the data transmission to the UE during the period of the configured transmission gaps. Furthermore, in the case of the UL transmission direction, the UE interrupts the data transmission to the NodeB during the period of the configured transmission gaps.

In connection with compressed mode (CM) the following "misbehaviour" of cellular radio networks has been experienced in field trials in real life: When the UE has sent a MR according to event 2d, the UTRAN might need a few seconds until CM is activated. During that time-span the UE might send additional MRs for events 1a/b/c. The UTRAN does not react to those MRs until CM is finally configured (i.e. activated). Once CM is finally configured, i.e. the UE has entered into CM, the UTRAN processes the single MRs one after the other as has been received in sequence. This leads to a sequence of ASUs, based on measurements which can already be outdated. As a consequence phone calls (in general: any connections between terminal and network) can get dropped, if the AS consists only of bad cells.

In principle, a UE could detect whether the UTRAN is not reacting on an MR. It also has knowledge of previously sent events 2d (more precisely: reports referring to events 2d). So there is a certain chance that such a situation can be detected and the next MR is only sent once CM is active.

A drawback of such non-standard compliant UE behaviour is that it is not guaranteed that the UTRAN is going to configure CM, once an event 2d is sent. This can lead to either still sending a few events 1a/b/c (in case CM is indeed being configured) or to detrimental suppression of events 1a/b/c (in case no CM will be configured despite different UE assumption).

In accordance with an embodiment of the invention an indication is sent together with a measurement report to indicate that a previous measurement report is not valid anymore.

This has the effect to prevent that an outdated measurement result is used to change the configuration of an active set of radio cells assigned to a cellular radio terminal. The UTRAN is enabled to process all received MRs in a proper way, once it is processing them again. It is in a position to delete outdated MRs, so that the ASU messages from UTRAN follows the latest MRs sent by the UE and it is ensured that only the best cells are included in the AS.

According to another embodiment the measurement identity of the outdated measurement report is signalled in the MR by the UE to UTRAN.

According to yet another embodiment a MR with an indication to replace a previous MR is sent. The indication may be a MR replacement indication to replace a specific previous MR.

According to yet another embodiment a MR with an indication to replace two or more previous MRs is sent. According to yet another embodiment the indication to replace two or more previous MRs is a MR replacement indication to replace any previous MR of a specific event type. This specific event type may be the same event type as the event type of the MR with the indication to replace two or more previous MRs or may alternatively be a different event type.

Figure 3:
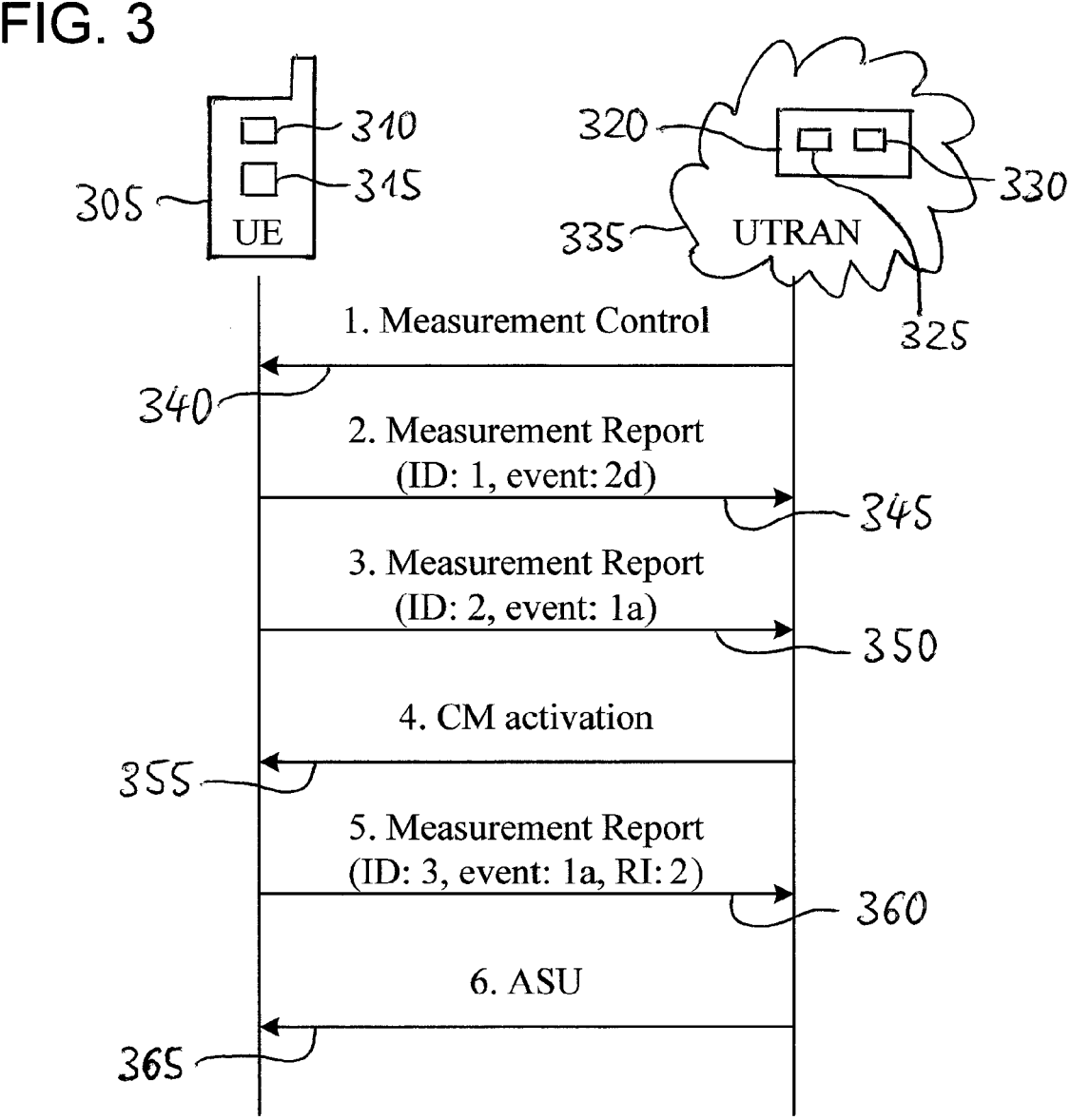
FIG. 3 shows a cellular radio terminal, a cellular radio network unit and a message flow in accordance with embodiments of the invention in a combined diagram.

In FIG. 3 a cellular radio terminal in accordance with an embodiment of the invention, a cellular radio network unit in accordance with another embodiment of the invention and a message flow in accordance with yet another embodiment of the invention are illustrated together in a message flow diagram.

The cellular radio terminal 305 (labeled "UE") has a send unit 310 configured to send a first measurement report, the send unit further configured to send a second measurement report after having sent the first measurement report, the second measurement report comprising an indication that the first measurement report is not valid anymore.

The cellular radio terminal 305 may also have a control unit 315 configured to enter compressed mode after the second measurement report has been sent. The control unit 315 is configured to enter compressed mode upon activation of compressed mode by UTRAN. This may occur at some point of time after the second measurement report has been sent.

The cellular radio network unit 320 has a receive unit 325 configured to receive a first measurement report, the receive unit further configured to receive a second measurement report after having received the first measurement report, the second measurement report comprising an indication that the first measurement report is not valid anymore.

The cellular radio network unit 320 also has a control unit 330 configured to discard the first measurement report, the control unit further configured to process the second measurement report.

In the following a message flow is described according to an embodiment of the invention where an exemplary UMTS system operating in W-CDMA and FDD mode is considered. The UE (short for "cellular radio terminal") 305 is operated in soft handover mode and its AS contains six cells. It is connected wirelessly to the UTRAN 335.

At 340 the UE 305 is configured by UTRAN 335 via Measurement Control message which measurements to perform (e.g. intra-frequency measurements, inter-frequency measurements, inter-RAT measurements) and is provided with information about the associated measurement reporting events with which the corresponding MR are triggered if the criteria for the events are fulfilled.

At 345 the UE 305 sends a measurement report 1 with identity "1" and the measured results according to event 2d. As a response to the measurement report 1 received at 345, UTRAN 335 starts configuring compressed mode in the UE 305, in order to enable the UE 305 to use the transmission gaps for measuring inter-frequency and inter-RAT cells according to the compressed mode patterns. Configuring compressed mode will take some time and is not yet completed at 350.

At 350 the UE 305 sends a measurement report 2 with identity "2" and the measured results (e.g. RSCP of the P-CPICH) for the cell which fulfilled the reporting event la.

At 355, UTRAN 335 has not yet responded to the measurement report 2 with identity "2". But in the meantime the configuration of compressed mode has been completed, i.e. at 355, compressed mode is activated and the UE 305 enters compressed mode.

At 360, UE 305 sends a measurement report 3 with identity "3" and the measured results (e.g. RSCP of the P-CPICH) for the cell which fulfilled the reporting event la. In addition, a MR replacement indication ("RI") is signalled with value "2" in this measurement report 3 for replacing the previous MR sent with identity "2", as that measurement report 2 has been outdated by this new measurement report 3.

At 365, UTRAN 335 sends an ASU message to UE 305 signalling that the cell indicated in the measurement report 3 received with identity "3" shall be included in the AS.

According to an embodiment of the invention, any embodiment defined by one of the claims may be combined with any one or more other embodiments defined by respective one or more of the other claims.

It should be noted that the expressions "first", "second" and "third", when used together with "measurement report", do not by themselves indicate a timely sequence of several measurement reports but instead are merely used to distinguish individual measurement reports from each other.

Abbreviations Used in This Document:
3GPP Third Generation Partnership Project
AS Active Set
ASU Active Set Update
BSIC Base transceiver Station Identity Code
CM Compressed Mode
CPICH Common Pilot Channel
DL Downlink
FDD Frequency Division Duplex
GSM Global System for Mobile Communication
MR Measurement Report
RAT Radio Access Technology
RSCP Received Signal Code Power
RSSI Received Signal Strength Indicator
UE User Equipment
UL Uplink
UMTS Universal Mobile Telecommunications System
UTRAN UMTS Terrestrial Radio Access Network
W-CDMA Wideband Code Division Multiple Access
Documents Cited in This Document:
[1] 3GPP TS 25.331: RRC protocol specification
[2] 3GPP TS 34.108: Common test environment for User Equipment—Conformance testing

The invention claimed is:

1. A method of measurement reporting with a cellular radio terminal, comprising:
sending a first measurement report; and
sending a second measurement report after the sending a first measurement report, the second measurement report comprising an indication that the first measurement report is not valid anymore, wherein the second measurement report comprises an identity information, the identity information identifying the first measurement report.

2. The method as recited in claim 1, wherein the second measurement report comprises an indication that the first measurement report is to be replaced by the second measurement report.

3. The method as recited in claim 1, wherein both the first measurement report and the second measurement report refer to a same reporting event category.

4. The method as recited in claim 1, further comprising: sending a third measurement report before the sending a second measurement report, the third measurement report indicating that compressed mode is to be entered.

5. The method as recited in claim 4, wherein the sending a third measurement report comprises sending the third measurement report before the sending a first measurement report.

6. The method as recited in claim 1, further comprising: entering compressed mode after the sending a second measurement report.

7. A method of handling measurement reports with a cellular radio network unit, comprising:
- receiving a first measurement report;
- receiving a second measurement report after the receiving a first measurement report, the second measurement report comprising an indication that the first measurement report is not valid anymore, wherein the second measurement report comprises an identity information, the identity information identifying the first measurement report;
- discarding the first measurement report; and
- processing the second measurement report.

8. The method as recited in claim 7, wherein the second measurement report comprises an indication that the first measurement report is to be replaced by the second measurement report.

9. The method as recited in claim 7, wherein both the first measurement report and the second measurement report refer to a same reporting event category.

10. The method as recited in claim 7, further comprising:
- receiving a third measurement report before the receiving a second measurement report, the third measurement report indicating that compressed mode is to be activated.

11. The method as recited in claim 10, wherein the receiving a third measurement report comprises receiving the third measurement report before the receiving a first measurement report.

12. The method as recited in claim 7, further comprising:
- activating compressed mode after the receiving a second measurement report.

13. The method as recited in claim 12, wherein the processing the second measurement report comprises processing the second measurement report after activating compressed mode.

14. A cellular radio terminal, comprising:
- a send unit to send a first measurement report, the send unit further to send a second measurement report after having sent the first measurement report, the second measurement report comprising an indication that the first measurement report is not valid anymore, wherein the second measurement report comprises an identity information, the identity information identifying the first measurement report.

15. The cellular radio terminal as recited in claim 14, the send unit further to send a third measurement report before having sent the second measurement report, the third measurement report indicating that compressed mode is to be entered.

16. The cellular radio terminal as recited in claim 14, further comprising:
- a control unit to enter compressed mode after the second measurement report has been sent.

17. A cellular radio network unit, comprising:
- a receive unit to receive a first measurement report, the receive unit further to receive a second measurement report after having received the first measurement report, the second measurement report comprising an indication that the first measurement report is not valid anymore, wherein the second measurement report comprises an identity information, the identity information identifying the first measurement report; and
- a control unit to discard the first measurement report, the control unit further to process the second measurement report.

18. The cellular radio network unit as recited in claim 17, the receive unit further to receive a third measurement report before having received the second measurement report, the third measurement report indicating that compressed mode is to be activated.

19. The cellular radio network unit as recited in claim 17, the control unit further to activate compressed mode after the second measurement report has been received.

20. The cellular radio network unit as recited in claim 17, the control unit further to process the second measurement report after compressed mode has been activated.

* * * * *